US011535481B2

(12) United States Patent
Stephan et al.

(10) Patent No.: US 11,535,481 B2
(45) Date of Patent: Dec. 27, 2022

(54) METHOD FOR OPERATING A SUCTION DEVICE OF A TEXTILE MACHINE, AND A SUCTION DEVICE AND A TEXTILE MACHINE

(71) Applicant: Maschinenfabrik Rieter AG, Winterthur (CH)

(72) Inventors: Adalbert Stephan, Beilngries/Paulushofen (DE); Bernhard Stang, Kipfenberg (DE)

(73) Assignee: Maschinenfabrik Rieter AG, Winterthur (CH)

( * ) Notice: Subject to any disclaimer, the term of this patent is extended or adjusted under 35 U.S.C. 154(b) by 378 days.

(21) Appl. No.: 16/900,916

(22) Filed: Jun. 13, 2020

(65) Prior Publication Data
US 2020/0391975 A1     Dec. 17, 2020

(30) Foreign Application Priority Data
Jun. 14, 2019   (DE) .................... 10 2019 116 224.6

(51) Int. Cl.
*B65H 54/70*   (2006.01)
*B01D 46/10*   (2006.01)
*D01H 11/00*   (2006.01)

(52) U.S. Cl.
CPC .......... *B65H 54/707* (2013.01); *B01D 46/10* (2013.01); *D01H 11/005* (2013.01)

(58) Field of Classification Search
CPC .... B65H 54/707; B01D 46/10; D01H 11/005; D01H 4/50
See application file for complete search history.

(56) References Cited

FOREIGN PATENT DOCUMENTS

| CN | 101113537 A | * | 1/2008 | ......... B01D 46/0056 |
|---|---|---|---|---|
| DE | 195 11 960 A1 | | 10/1996 | |
| DE | 196 53 617 A1 | | 6/1998 | |
| DE | 10 2006 035 729 A1 | | 1/2008 | |
| DE | 10 2006 050 220 A1 | | 4/2008 | |
| DE | 10 2007 006 679 A1 | | 8/2008 | |
| DE | 10 2008 040 992 A1 | | 3/2009 | |
| DE | 10 2009 028 359 A1 | | 2/2011 | |

OTHER PUBLICATIONS

German Patent Office Search Report, dated Apr. 22, 2020.
EPO Search Report, dated Nov. 26, 2020.

* cited by examiner

*Primary Examiner* — Jacob M Amick
*Assistant Examiner* — Charles J Brauch
(74) *Attorney, Agent, or Firm* — Dority & Manning, P.A.

(57) ABSTRACT

A method is provided for operating a suction device of a textile machine having a plurality of workstations wherein an air flow and a vacuum are produced with aid of the suction device. The method includes filtering the air flow with a filter element, and determining a loss of pressure or volume flow at the filter element. Based on the loss of pressure or the volume flow, an actual value is calculated for present maximum vacuum-requiring operations of the workstations that can be simultaneously executed. Based on the number of operating workstations, a setpoint value is determined for the maximum vacuum-requiring operations of the workstations that can be simultaneously executed. The setpoint value is compared to the actual value for control of the suction device.

15 Claims, 1 Drawing Sheet

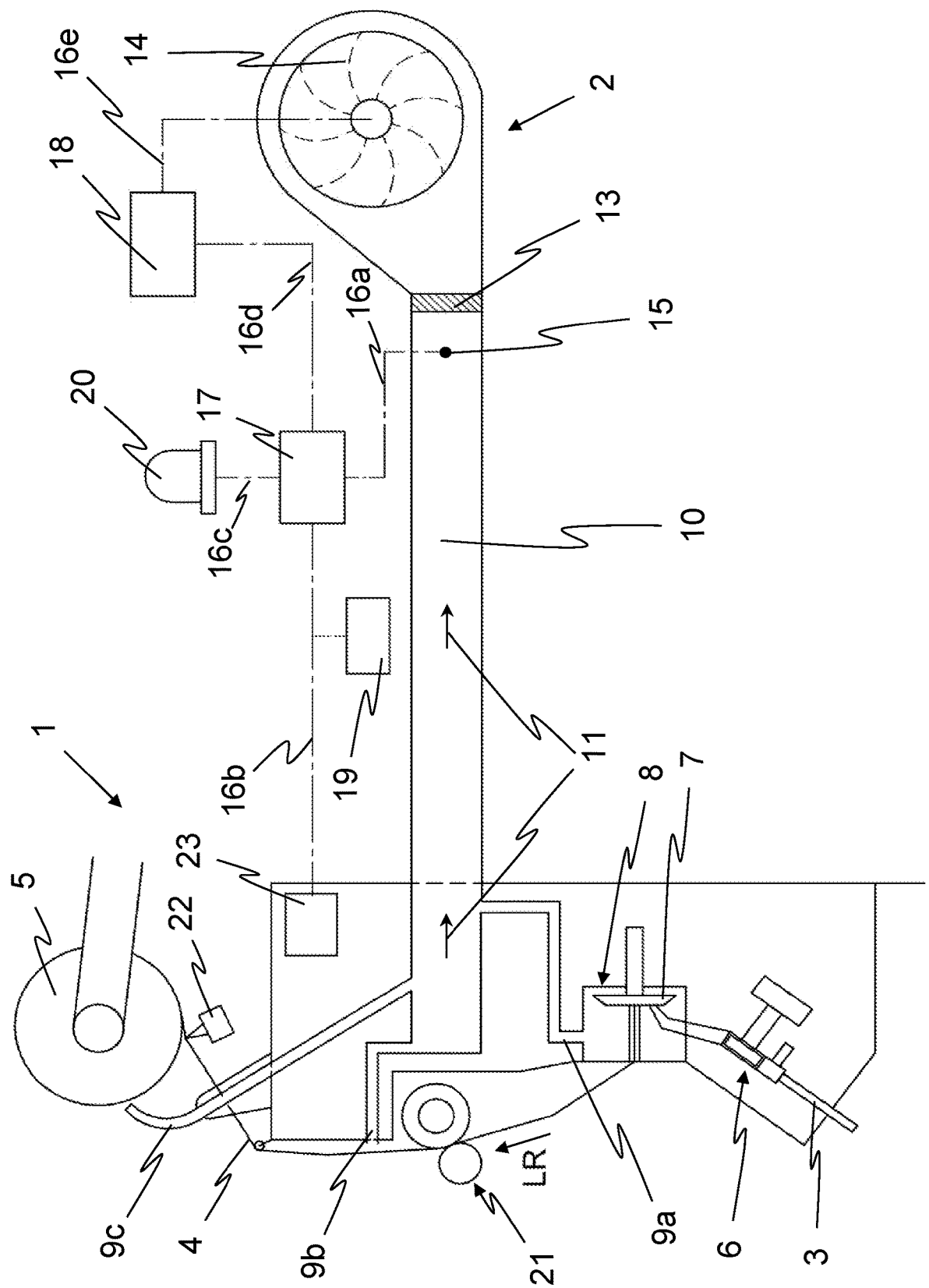

METHOD FOR OPERATING A SUCTION DEVICE OF A TEXTILE MACHINE, AND A SUCTION DEVICE AND A TEXTILE MACHINE

FIELD OF THE INVENTION

The present invention relates to a method for operating a suction device of a textile machine comprising a plurality of workstations, in particular a spinning machine, wherein, with the aid of the suction device, an air flow and a vacuum are generated, and the air flow is filtered with the aid of a filter element. A present loss of pressure and/or a volume flow at the filter element are/is determined, on the basis of which an actual value of the present maximum vacuum-requiring operations that can be simultaneously executed is calculated. Moreover, the invention relates to a suction device and a textile machine for carrying out at least portions of this method.

BACKGROUND

It is known that suction devices are utilized at a plurality of textile machines and, there, remove contaminants, dust, and fluff, which accumulate during the processing of fiber materials. For this purpose, an air flow is usually generated in the areas of easily soiled system components with the aid of one or multiple ventilator(s) or other vacuum sources and is removed via appropriate suction tubes and/or suction ducts. These easily soiled system components include, for example, the spinning stations or the drafting system of spinning machines. In order to free the air, which has been removed, of the contaminants, the air is usually directed through filter elements, which are arranged in the suction device generally upstream from the vacuum source and, therefore, must be passed through. Since this results in an accumulation of the contaminants on the filter element, the filter element must be cleaned and/or replaced at certain time intervals. This can take place manually or with the aid of automatically operating cleaning devices.

DE 10 2006 035 729 A1 describes a method for removing and filtering dust—and/or fiber-loaded air, wherein the vacuum upstream and/or downstream from the filter is measured and controlled or regulated. In the case of a deviation from a setpoint vacuum value or a setpoint vacuum range, the filter cleaning process is set in motion.

Moreover, DE 10 2009 028 359 A1 describes a method for controlling the suction device of a textile machine, wherein the rotational speed of the ventilator and the operating status of the cleaning device are matched to each other.

While the aforementioned methods already contribute to a more energy-efficient operation of the particular textile machines, there is still a desire for further energy savings while simultaneously optimizing production.

SUMMARY OF THE INVENTION

A problem addressed by the present invention is therefore that of creating a suction device, a textile machine, and a method for operating a suction device of a textile machine, which is distinguished by significant energy savings combined with a simultaneous optimization of productivity as compared to already known systems and methods. Additional objects and advantages of the invention will be set forth in part in the following description, or may be obvious from the description, or may be learned through practice of the invention.

The problems are solved by a suction device, a textile machine, and a method for operating a suction device of a textile machine having the features set forth herein.

The invention relates to a method for operating a suction device of a textile machine comprising a plurality of workstations, in particular a spinning machine, wherein, with the aid of the suction device, an air flow and a vacuum are generated, and the air flow is filtered with the aid of a filter element. A present loss of pressure and/or a volume flow at the filter element are/s determined, on the basis of which an actual value of the present maximum vacuum-requiring operations that can be simultaneously executed is calculated. This actual value describes the present condition of the suction device and the present productivity. A setpoint value for the present maximum vacuum-requiring operations that can be simultaneously executed is determined, in particular, based on a present number of "ends down" of the workstations (i.e., the operating workstations). The setpoint value can be determined, for example, from a database stored in a control system, and can be automatically set and/or manually set, for example, by an operator. The purpose of an automated determination and setting of the setpoint value is to achieve a machine-specific optimization of the suction device. It is also advantageous when, in particular, an operator can manually implement a correction of this setpoint value or set an independent setpoint value and, therefore, can respond to present and/or future events. Therefore, in addition, the treasure trove of experience of the operator can be accessed. This setpoint value is compared to the actual value. In contrast to the current prior art, therefore, due to the determination, the measurement, and the comparison of these setpoint and actual values, an optimization of the suction device can be achieved based on the simultaneously executable, vacuum-requiring operations of the same workstation or of different workstations. In this way, the suction device can always be operated in the optimal operating range, for example, depending on the present number of ends down.

It is advantageous when, if the actual value reaches or falls below the setpoint value, the need for a filter cleaning is signaled and/or the filter cleaning is carried out in an automated manner. Therefore, in the case of an advanced accumulation of contaminants on the filter, the filter of the suction device can be cleaned in an automated manner or manually after the signaling. This generally results in an increase of the actual value, so that the actual value can reach or exceed the setpoint value.

It is also advantageous when the number of executable, vacuum-requiring operations is limited if the expected consumption of additional operations would exceed the setpoint value. As a result, in particular, an estimation can be carried out with regard to how great the extent of the soiling of the filter is and/or whether a set or calculated setpoint value can be achieved with the relevant suction device.

It is also extremely advantageous when an optimization, in particular a production optimization and/or an energy optimization, of the textile machine takes place with the aid of the setpoint value. For this purpose, a calculation is carried out to determine which setpoint value is necessary in order to ensure a maximum productivity of the textile machine. Simultaneously, the unnecessary energy demand due to a high level of soiling of the filter should be taken into account. An optimum of the setpoint value is calculated based on these two variables. It is also conceivable that only one of these two variables is optimized.

It is advantageous when an optimization identifier is manually set, wherein this defines a compromise between production optimization and energy optimization. Therefore, the textile machine can be variably set to an optimization that leans more toward production optimization or energy optimization.

It is also advantageous when the setpoint value is prematurely adapted on the basis of the development of the number of ends down, and, thereby, an overload is avoided. As a result, already in the case of significantly small changes of the numbers of ends down, an estimation can be carried out with regard to the optimization of the suction system that will be necessary in the future, in order to continue to operate the suction system in the optimal condition.

It is particularly advantageous when the energy consumption is predicted on the basis of the setting of the setpoint value that was implemented. This contributes to an improved estimation of the energy condition of the suction system and helps to establish the optimal operating condition of the textile machine.

It is particularly advantageous when a vacuum-requiring operation, in particular an operation of a trash removal nozzle or even of another suction position, is switched off if filter cleaning has not been carried out and/or in the case of a temporary increase of the actual value. In this way, brief spikes in the demand for compressed air can be compensated for and the error-free function of the suction system can be ensured. In this way it can be determined, for example, that all identical suction positions, in particular trash removal nozzles, of the textile machine are switched off until the power of the suction device increases again.

It is particularly advantageous when the actual value is controlled and/or regulated with the aid of a control system and/or a regulating system. As a result, the rotational speed of the ventilator can always be regulated in such a way that the actual value reaches the setpoint value. The control system can also be designed in such a way that the cleaning can be started after a throttling of the production speed and/or the ventilator speed.

Moreover, it is advantageous when the loss of pressure of the suction device upstream and/or downstream from the filter element is measured with the aid of at least one pressure sensor and/or the loss of pressure is calculated on the basis of the power increase of a ventilator. As a result, a conclusion can always be drawn regarding the present condition of the filter element and, therefore, in particular regarding its level of contamination. If the filter element reaches a certain level of contamination, which results either in the actual value not reaching the setpoint value or in a condition that is not optimal with respect to energy, the cleaning process is started and/or signaled.

Moreover, a suction device is provided for removing and filtering dust- and/or fiber-loaded air in textile machines comprising a plurality of workstations, in particular spinning machines, which comprises a ventilator for generating an air flow and for providing a vacuum, and a filter element for filtering the air flow. According to the invention, this suction device comprises an evaluation unit for carrying out the method according to the description, above.

It is particularly advantageous when the suction device comprises a signal unit for signaling the need for a filter cleaning and/or the start of the automatic filter cleaning. Therefore, in the case of an advanced accumulation of contaminants on the filter, the filter of the suction device can be cleaned in an automated manner or manually after the signaling. The signaling of an automated filter cleaning also contributes to improved workplace safety, since an operator is prompted to clean a filter.

It is also advantageous when the suction device comprises a control unit and/or regulating unit for controlling and/or regulating the actual value. As a result, the rotational speed of the ventilator can always be regulated, so that the actual value reaches the setpoint value.

It is also advantageous when the suction device comprises at least one pressure sensor for measuring the pressure upstream and/or downstream from the filter element and/or when the suction device comprises at least one measuring unit for measuring the power increase of the ventilator and, on the basis thereof, calculating the loss of pressure. Due to the measurement of the loss of pressure, the present condition of the filter element can be determined at any time and the need for a filter cleaning can be indicated or the filter cleaning can be carried out in an automated manner. In the case of a measurement of this loss of pressure on the basis of the power increase of the motor of the ventilator, it is also advantageous that additional measurement technology is not necessarily needed, but rather that an estimation of this loss of pressure takes place directly from the measuring unit of the ventilator. This measuring unit is mostly already necessary for the general operation of the ventilator and/or is contained in the regulating unit.

Moreover, a textile machine, in particular a spinning machine, is provided, which comprises a plurality of vacuum-requiring workstations, and a suction device for removing and filtering dust- and/or fiber-loaded air. According to the invention, the textile machine comprises a suction device for carrying out the method according to the description, above.

BRIEF DESCRIPTION OF THE DRAWING

Further advantages of the invention are described in the following exemplary embodiments. Wherein:

FIG. 1 shows a schematic longitudinal section of a textile machine comprising a suction device.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic side view of a workstation 1 of a textile machine and a suction device 2 adjacent thereto. The textile machine can comprise a plurality of workstations 1, in order to increase a productivity of the textile machine according to the number of workstations 1. In the present exemplary embodiment, the workstation 1 is designed as a spinning station of a rotor spinning machine. In principle, however, the invention is usable on any type of textile machine, in particular on other spinning machines.

The workstation 1 produces a thread 4 from a sliver 3. The thread 4 passes through the workstation 1 in a delivery direction LR and, finally, is wound onto a package 5.

Initially, the sliver 3 is fed to an opening unit 6 and is opened, by the opening unit 6, into its individual fibers. The individual fibers are guided to a spinning rotor 7, which produces the thread 4 from the individual fibers. In the present exemplary embodiment, the spinning rotor 7 is arranged in a spin box 8, to which a vacuum is applied. This vacuum in the spin box 8 is produced via a first suction tube 9a. The thread 4 formed by the spinning rotor 7 is drawn off the spinning rotor 7, out of the spin box 8, with the aid of a delivery roller pair 21. Positioned downstream from the delivery roller pair 21 in the delivery direction LR, the workstation 1 comprises a second suction tube 9b, which is utilized, in particular, for the interim storage of a loop of the thread 4. A traversing unit 22 traverses the thread 4 laterally with respect to the delivery direction LR in such a way that the thread 4 is wound onto the package 5 in the desired way. In addition, a third suction tube 9c is provided, which is arranged in a stationary or swivelable manner and can find and suck in a thread end traveling on the package 5, for example, after a thread break.

In the exemplary embodiment shown, the suction tubes 9a, 9b, and 9c empty into a common suction duct 10. In addition to the suction tubes 9a, 9b, 9c shown here, at least one additional suction tube is conceivable, which is utilized, in particular, for trash removal and is arranged at a trash removal nozzle. Further suction systems (not represented here), which also empty into the suction duct 10, can also be provided, for example, for cleaning the workstation or for the interim storage of a thread end during the piecing onto an empty tube. Since the vacuum requirements of the individual suction tubes, in particular of the first suction tube 9a of the spin box 8, can have different requirements, separate suction ducts 10 and/or separate suction devices 2 for the suction tubes 9a, 9b, 9c are conceivable. The direction of flow of the air that has been removed and is to be filtered is indicated by arrows 11.

The suction duct(s) 10 is/are connected to the suction device(s) 2. At the textile machine, one suction duct 10 for the entire textile machine can be provided and can extend along the plurality of workstations 1. From each of the workstations 1, the particular suction tubes 9a, 9b, 9c empty into the suction duct 10. In the exemplary embodiment represented, a filter element 13 is located between the suction duct 10 and the suction device 2. This filter element 13 could also be arranged in the suction duct 10 or within the suction device 2, in particular directly at a ventilator 14. The filter element 13 is utilized for filtering the dust- and/or fiber-loaded air, which is sucked in from the suction duct 10 at the textile machine in the direction of the arrows 11. Due to the filtering of this air, contaminants, such as, for example, dust and fibers, accumulate on the surface of the filter element 13 and increasingly clog the filter element 13.

At least one pressure sensor 15 is installed in the suction duct 10 and/or in the suction device 2 upstream from the ventilator 14, which measures the vacuum in the suction duct 10 continuously or at certain time intervals and forwards the measured values to an evaluation unit 17 via a first line 16a. In addition to or instead of the at least one pressure sensor 15, the evaluation unit 17, a regulating unit 18, and/or an additional measuring unit can calculate the vacuum or the loss of pressure at the filter element 13 on the basis of the power increase of the ventilator 14. In the present exemplary embodiment, the loss of pressure is determined with the aid of a pressure sensor 15 in the suction duct 10. On the basis of this loss of pressure, an actual value of the present maximum vacuum-requiring operations that can be simultaneously executed is calculated. If the filter element 13 is free of contaminants, this actual value is a maximum value. The maximum value is therefore always known and can be compared to the present actual value. This comparison shows the extent of the contamination of the filter element 13 and/or indicates other faults in the suction device 2. Operations that require a vacuum can be, for example, piecing operations, such as seeking a thread end on the package 5 or the interim storage of a thread loop, or the cleaning of the workstation 1 and/or the spin box 8.

Via a second line 16b, the evaluation unit 17 is connected to the control unit 23 of the textile machine and/or to an input unit 19. The line 16b forwards the pieces of information of a setpoint value for the present maximum vacuum-requiring operations that can be simultaneously executed and/or of a present number of ends down of one or multiple workstation(s) 1 to the evaluation unit 17. The setpoint value is established on the basis of the present number of ends down of the individual workstations 1 of the textile machine (the operating work stations). Therefore, this setpoint value should be higher in the case of a high number of ends down, since there is a greater likelihood that a large number of vacuum-requiring operations will be needed. In the case of a low number of ends down, this setpoint value can be lower, since a low number of vacuum-requiring operations is more likely to be needed. The comparison of the actual value and the setpoint value can therefore take place in the evaluation unit 17.

As the machine run time increases, a steadily increasing amount of contaminants accumulates on the filter element 13. Due to the resultant increased loss of pressure, a constant reduction of the actual value results. If the actual value reaches or falls below the setpoint value, this is registered by the evaluation unit 17 and this piece of information is forwarded to a signal unit 20 via a third line 16c. This signal unit 20, in turn, signals the need for a filter cleaning. The filter cleaning can also take place in an automated manner, wherein the signal unit 20 is utilized as a warning signal in this case. Due to the filter cleaning, the actual value is increased and reaches the maximum value. Since the maximum value defines the value that the suction device 2 can maximally output, the setpoint value should not be greater than the maximum value.

Due to the comparison of the actual value and the setpoint value, an optimization of the suction device 2 can take place. This results in a production optimization and/or an energy optimization of the suction device 2 and/or of the textile machine. Therefore, the suction device 2 can be adjusted with the aid of the evaluation unit 17 depending on the present requirements. In addition, with the aid of the input unit 19, the input of an optimization identifier is possible, which defines the compromise between production optimization and energy optimization. In this way, a more detailed adjustment for the optimization can be implemented. In addition, with the aid of the evaluation unit 17, the development of the number of ends down is estimated based on the pieces of information of the textile machine and is directly incorporated into the setting of the setpoint value. In this way, production fluctuations can be responded to in the shortest possible time. If a brief production fluctuation arises or a filter cleaning is not possible due to external developments, one or multiple suction tube(s) 9a, 9b, 9c and/or the trash removal nozzle (not represented here) can be switched off. This can take place, for example, with the aid of utilized throttle valves. The evaluation unit 17 can additionally predict the energy consumption on the basis of the present setpoint value and the estimation of the subsequent setpoint value.

The regulation and/or control of the ventilator 14 is performed by the regulating unit 18. For this purpose, the pieces of information from the evaluation unit 17 are forwarded to the regulating unit 18 via a fourth line 16d. This regulating unit 18 is connected to a fifth line 16e to the ventilator 14 and regulates its speed and, therefore, the vacuum in the suction device 2. However, if the maximum speed of the ventilator 14 has been reached and the resultant actual value is not sufficient in order to reach the necessary setpoint value, a filter cleaning is to be carried out.

In the exemplary embodiment shown, the evaluation unit 17, the input unit 19, the signal unit 20, the regulating unit 18, and the control unit 23 of the textile machine are designed as separate units. One or multiple of the individual functions of the evaluation unit 17, the input unit 19, the signal unit 20, the regulating unit 18, and/or the control unit 23 can also be performed by one common unit.

The present invention is not limited to the exemplary embodiment that has been represented and described. Modifications within the scope of the claims are also possible, as is any combination of the features, even if they are represented and described in different exemplary embodiments.

LIST OF REFERENCE NUMBERS

1 workstation
2 suction device
3 sliver
4 thread
5 package
6 opening unit
7 spinning rotor
8 spin box
9 suction tubes
10 suction duct
11 arrows, direction of flow
13 filter element
14 ventilator
15 pressure sensor(s)
16 electrical lines
17 evaluation unit
18 regulating unit of the ventilator
19 input unit
20 signal unit
21 delivery roller pair
22 traversing device
23 control unit of the textile machine
LR delivery direction

The invention claimed is:

1. A method for operating a suction device of a textile machine having a plurality of workstations wherein an air flow and a vacuum are produced with aid of the suction device, the method comprising:
   filtering the air flow with a filter element;
   determining a loss of pressure or volume flow at the filter element;
   based on the loss of pressure or the volume flow, calculating an actual value for present maximum vacuum-requiring operations of the workstations that can be simultaneously executed;
   based on the number of operating workstations, determining a setpoint value for the maximum vacuum-requiring operations of the workstations that can be simultaneously executed; and
   comparing the setpoint value to the actual value for control of the suction device.

2. The method as in claim 1, wherein when the actual value reaches or falls below the setpoint value, a signal is generated for need of a cleaning of the filter element or the filter element is cleaned in an automated manner.

3. The method as in claim 1, wherein a number of the executable vacuum-requiring operations is limited if the actual value exceeds the setpoint value.

4. The method as in claim 1, wherein the setpoint value is used for controlling the textile machine to optimize production or energy consumption of the suction device.

5. The method as in claim 4, wherein an optimization identifier is manually set in the textile machine, the optimization identifier defining a compromise between production optimization and energy consumption optimization.

6. The method as in claim 1, wherein the setpoint value is modified based on anticipation of additional workstations becoming operable.

7. The method as in claim 3, wherein energy consumption of the suction device is predicted based on the setpoint value.

8. The method as in claim 1, wherein at least one of the executable vacuum-requiring operations is switched off when a cleaning of the filter element is indicated by the comparison of the setpoint value to the actual value and is not carried out.

9. The method as in claim 1, wherein the actual value is controlled or regulated with a control system or a regulating system.

10. The method as in claim 1, wherein the loss of pressure is measured with a pressure sensor upstream or downstream of the filter element or is calculated based on power consumption of a ventilator that produces the volume flow in the suction device.

11. A suction device for removing and filtering dust and fiber-loaded air in a textile machine that has a plurality of workstations, comprising:
    a ventilator disposed to produce an air flow and provide a vacuum;
    a filter element disposed to filter the air flow; and
    an evaluation unit configured to carry out the method according to claim 1.

12. The suction device as in claim 11, further comprising a signal unit that signals a need to clean the filter element or signals that an automated cleaning of the filter element has started.

13. The suction device as in claim 11, further comprising a control unit or regulating unit configured with the ventilator to control the actual value.

14. The suction device as in claim 11, further comprising a pressure sensor disposed to measure pressure upstream or downstream of the filter element or a measuring unit to detect power consumption of the ventilator for calculating the loss of pressure based on the power consumption.

15. A textile machine, comprising:
    a plurality of vacuum-requiring workstations; and
    the suction according to claim 11.

* * * * *

UNITED STATES PATENT AND TRADEMARK OFFICE
CERTIFICATE OF CORRECTION

| | |
|---|---|
| PATENT NO. | : 11,535,481 B2 |
| APPLICATION NO. | : 16/900916 |
| DATED | : December 27, 2022 |
| INVENTOR(S) | : Adalbert Stephan and Bernhard Stang |

Page 1 of 1

It is certified that error appears in the above-identified patent and that said Letters Patent is hereby corrected as shown below:

In the Claims

Column 8 Line 19 Claim 7 should read:
7. The method as in claim 1, wherein energy consumption of the suction device is predicted based on the setpoint value.

Signed and Sealed this
Sixteenth Day of January, 2024

Katherine Kelly Vidal
*Director of the United States Patent and Trademark Office*